(12) United States Patent
Cummings

(10) Patent No.: US 7,632,398 B2
(45) Date of Patent: Dec. 15, 2009

(54) FILTER AND METHOD OF FILTERING A FLUID

(75) Inventor: David C. Cummings, 165 Robert Rd., Crouse, NC (US) 28033

(73) Assignee: David C. Cummings, Crouse, NC (US)

( * ) Notice: Subject to any disclaimer, the term of this patent is extended or adjusted under 35 U.S.C. 154(b) by 0 days.

(21) Appl. No.: 12/042,509

(22) Filed: Mar. 5, 2008

(65) Prior Publication Data
US 2009/0223905 A1 Sep. 10, 2009

(51) Int. Cl.
*F01M 11/03* (2006.01)
*B01D 35/02* (2006.01)

(52) U.S. Cl. .................. 210/98; 210/136; 210/167.02; 210/167.04; 210/252; 210/258; 210/424; 210/428; 123/196 A

(58) Field of Classification Search ................ None
See application file for complete search history.

(56) References Cited

U.S. PATENT DOCUMENTS

| | | | | |
|---|---|---|---|---|
| 3,278,031 A | * | 10/1966 | Rosaen | 210/106 |
| 3,283,903 A | * | 11/1966 | Muller | 210/108 |
| 3,374,052 A | * | 3/1968 | Fan et al. | 423/653 |
| 3,572,507 A | * | 3/1971 | Juskevic | 210/97 |
| 3,598,238 A | * | 8/1971 | Collins, Jr., | 210/138 |
| 3,608,722 A | * | 9/1971 | Picard | 210/108 |
| 3,717,252 A | * | 2/1973 | Picard | 210/108 |
| 3,850,802 A | * | 11/1974 | Berger | 210/106 |
| 3,944,488 A | * | 3/1976 | Moatti | 210/108 |
| 4,022,694 A | * | 5/1977 | Fruman | 210/350 |
| 4,061,575 A | * | 12/1977 | Randle | 210/350 |
| 4,770,771 A | * | 9/1988 | Buckminster | 210/108 |
| 4,776,962 A | * | 10/1988 | Wakeman | 210/748 |
| 4,812,230 A | * | 3/1989 | Gerulis | 210/108 |
| 4,897,186 A | * | 1/1990 | Gerulis | 210/108 |
| 6,354,790 B1 | * | 3/2002 | Cummings et al. | 414/729 |
| 2005/0211608 A1 | * | 9/2005 | Lockwood | 210/106 |
| 2006/0131220 A1 | * | 6/2006 | Lockwood | 210/106 |
| 2009/0223905 A1 | * | 9/2009 | Cummings | 210/767 |

OTHER PUBLICATIONS

United States Patent & Trademark Office Class 210 Schedule—Class 210 Liquid Purification or Separation, Oct. 2006, 14 Pages.*
United States Patent & Trademark Office Class 210 Definitions—Class 210 Liquid Purification or Separation, Oct. 2006, 129 Pages.*

* cited by examiner

*Primary Examiner*—Robert James Popovics
(74) *Attorney, Agent, or Firm*—Novak Druce & Quigg LLP

(57) ABSTRACT

A filter including a first chamber; a second chamber; a piston having a head portion disposed in the first chamber and a rod portion disposed in the second chamber; a third chamber containing a filter medium, having an inlet communicating with the second chamber and an outlet; first and second conduits supplying fluid under pressure to the first and second chambers, respectively; and a valve in the first conduit operable to direct fluid under pressure to opposite sides of the piston head portion to reciprocate the piston and correspondingly eject fluid in the second chamber through the third chamber.

24 Claims, 2 Drawing Sheets

FILTER AND METHOD OF FILTERING A FLUID

This invention relates to a filter and a method of filtering a fluid and more particularly to such a filter and method for effectively cleaning such a fluid. The invention further contemplates an oil lubricating system for an engine effective in providing a greater filtration of contaminants in such oil than generally available in prior art lubricating systems.

BACKGROUND OF THE INVENTION

Oil lubricating systems for engines typically have consisted of a circuit for circulating oil from the oil sump of the engine to the working components of the engine and then back to the sump, cooling such components and removing contaminants entrained in the oil. Such working components generally include the pistons, cylinders, piston rings, crankshaft, connecting rods, camshafts and various bearings therefor. Such contaminants include the effects of abrasion, adhesion, corrosion and fretting of engine components. Such circuit further is typically provided with a pump for circulating the oil through the system, having a bypass including a relief valve, and a filter for removing such contaminants. Such filters, however, generally have been found not to be entirely effective in the removal of such contaminants. As a remedy for such ineffective removal of contaminants, it has been recommended and the general practice of simply periodically changing the oil in such systems with clean oil. Such practice of replacement of used oil not only is expensive and inefficient but time consuming. It further is undesirable in that it contributes to increased fuel energy consumption and presents disposal problems which affect the environment. Accordingly, it is the principal object of the present invention to provide a novel filter and method of finer filtering fluids and particularly motor oils used in lubricating engines, thus requiring less replacement and disposal of used oils.

SUMMARY OF THE INVENTION

The principal object of the present invention is achieved by providing a secondary filter in a fluid line downstream of a conventional primary filter, generally comprising a means defining a first cylindrical chamber; means defining a second cylindrical chamber; means defining a third chamber communicating with the second cylindrical chamber, containing a filter medium and having an outlet port communicable with the fluid line; a piston having a head portion disposed in and reciprocal within the first chamber and a rod portion disposed in and reciprocal within the second chamber, the head portion of such piston having a cross sectional area larger than the cross-sectional area of the rod portion; means communicating the fluid line to the second chamber at a point beyond an end of the rod portion of the piston when the piston is in a retracted position; and means for alternatively intercommunicating the fluid line with opposite ends of the first chamber to reciprocate the piston, wherein such components are sufficiently sized, configured and positioned whereby a portion of the fluid circulating in the fluid line at a selected pressure will be admitted into the second chamber, compressed to a higher pressure by the piston and caused to flow through the filter medium of the third chamber, thereby undergoing a secondary cleaning operation.

DETAILED DESCRIPTION OF THE PREFERRED EMBODIMENT OF THE INVENTION

Figure 1:
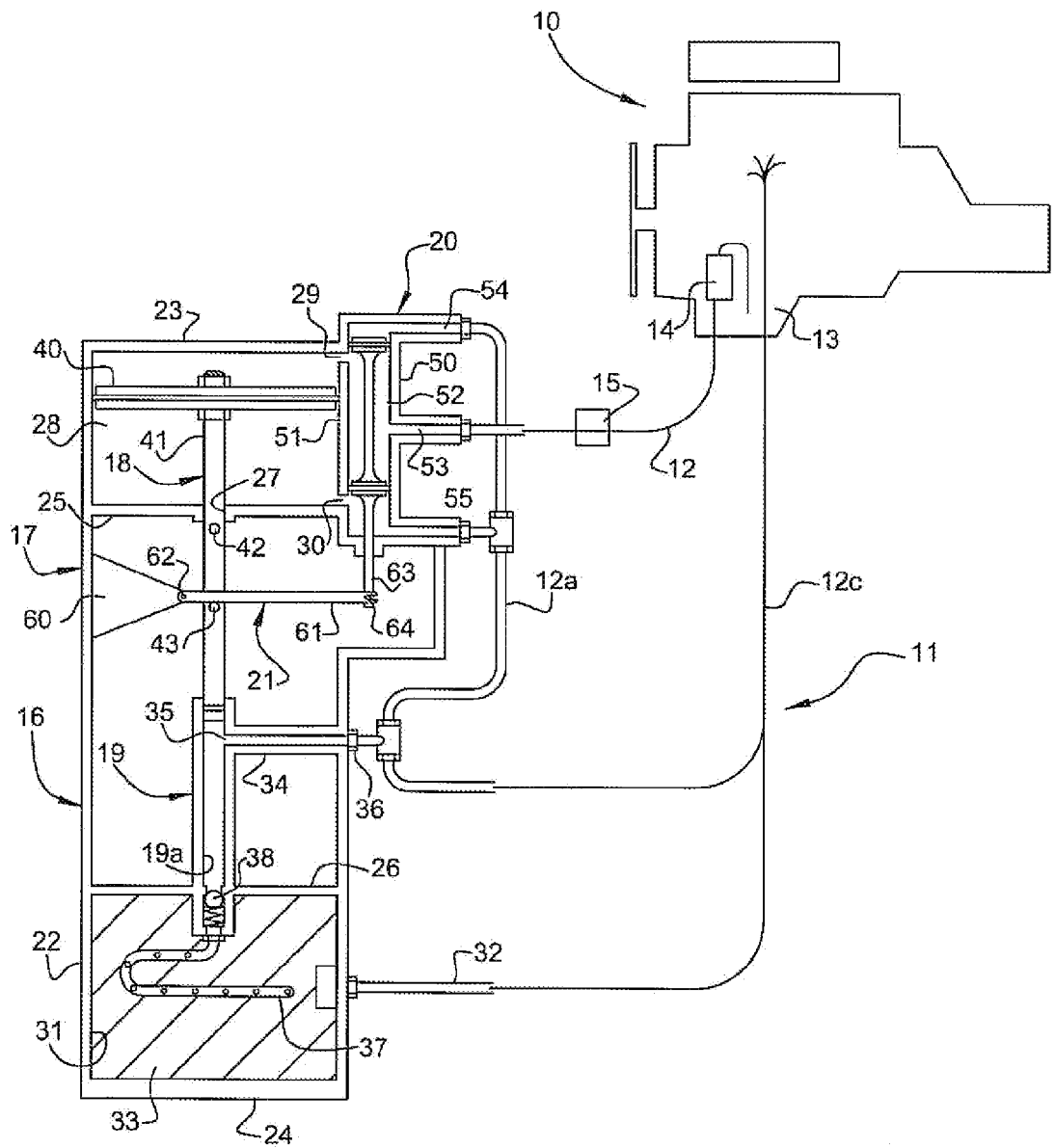
FIG. 1 is a diagrammatic view of an engine including an oil lubricating system embodying the present invention.

Referring to FIG. 1 of the drawings, there is illustrated an internal combustion engine 10 provided with an oil lubricating system 11. Engine 10 is of a conventional construction generally including an engine block provided with a set of cylinders, a crankshaft journaled in the engine block, a set of pistons disposed in the cylinders having rods connected to the crankshaft, a cylinder head mounted on the cylinder block provided with sets of valves, one or two camshafts journaled in the cylinder head and cooperating with the valves, a timing chain operatively interconnecting the crankshaft and the camshaft or camshafts and other conventional auxiliary components. Lubricating system 11 generally includes an oil line 12 having one end submerged in a pool of oil provided in oil sump 13 of the engine and an opposite end disposed in an upper portion of the engine for dispersing oil to the working components of the engine. Included in such oil line is a pump 14 for pumping the oil from the sump through the system, a primary filter 15 provided with a bypass line including a relief valve and a secondary filter 16 embodying the present invention. Primary filter 15 is of a conventional construction including a filter cartridge which may be replaced periodically in the conventional manner.

Secondary filter 16 includes a housing 17, a piston 18 disposed within the housing, a guide member 19 disposed within the housing and cooperating with the piston, a valve 20 mounted on the housing and cooperating with the piston and an actuating mechanism 21 disposed within the housing and cooperating with piston 18 and valve 20. Housing 16 is provided with a cylindrical wall 22, a pair of end walls 23 and 24 and a pair of partition walls 25 and 26. Partition wall 25 has an axially disposed opening 27 relative to the housing side wall provided with a cylindrical wall 22, a pair of end walls 23 and 24 and a pair of partition walls 25 and 26. Partition wall 25 has an axially disposed opening 27 relative to the housing side wall and cooperates with the housing side wall and end wall 23 to provide a chamber 28. The side wall portion of chamber 28 is provided with a set of ports 29 and 30 adjacent end and partition walls 23 and 25, respectively. Partition wall 26 and end wall 24 cooperate with a portion of the housing side wall to provide a chamber 31 having an opening disposed coaxially with opening 27 in partition wall 25. The side wall portion of chamber 31 further is provided with an outlet communicating with return oil line 12c through a branch line 32. Chamber 31 is provided with a filter medium 33 which may consists of any fine filtering material consisting of a fabric or any other suitable material.

Guide member 19 consists of a cylindrically configured member providing a chamber 19a, having a lower end thereof extending through the axial opening in partition wall 26, and an upper end provided with a transversely disposed conduit portion intercommunicating a port 35 at the upper end of member 19 with a port 36 in the side wall of the housing member. A flexible conduit 37 having a plurality of openings spaced along the length thereof is connected to the lower end of member 19 and in communication therewith, and extends through filter medium 33 in chamber 31 to convey and disperse fluid from member 19 throughout the filter medium. Also provided in the lower end of member 19 extending into chamber 31 is a check valve 39 which functions to permit fluid to flow from the interior of guide member 19 into chamber 31 and preclude the flow of fluid in the opposite direction.

Piston 18 consists of a head portion 40 and a rod portion 41. Head portion 40 is disposed in chamber 28 and divides such chamber into a pair of variable chambers each communicating with a port 29 and 30. Rod portion 18 is axially disposed relative to housing side wall 22 and extends through opening 27 in partition wall 25 and into an upper end of guide member 19. Intermediate the ends thereof, the rod portion is provided with a pair of spaced, trip pins 42 and 43 projecting substantially perpendicularly relative to the axis of the rod portion.

Valve 20 is a conventional spool type valve including a housing 50 mounted on housing 16 and a spool 51. Housing 50 is provided with a cylindrical chamber 52 communicating at a center thereof with fluid line 12 through a passageway 53, at one end thereof to chamber 28 on one side of piston portion 40 through port 29, and a portion of fluid line segment 12a through a passageway 54, and at an opposite end thereof with chamber 28 on the rod side of the piston through a port 30 and fluid line portion 12a through a passageway 55. Disposed in chamber 52 and displaceable axially therein in the conventional manner, is spool 51. Such spool is operable to displace axially to alternatively intercommunicate fluid line 12 with the piston head side of chamber 28 through passageway 53 and port 29 while intercommunicating the rod side of chamber 28 with fluid line section 12a through port 30 and passageway 55 to cause the piston to extend, and intercommunicate fluid line 12 with the rod side of chamber 28 through passageway 53 and port 30 while intercommunicating the piston side of chamber 28 with fluid line section 12a through port 29 and passageway 54 to cause the piston to retract.

Tripping mechanism 21 consists of a support bracket 60 mounted on an inner side of side housing wall 22, and an arm member 61 pivotally connected at one end to support bracket 60 as at 62, extending adjacent to rod section 41 between trip pins 42 and 43, and connected at an opposite end thereof to an axially projecting portion 63 of spool 51 as at 64. As piston 18 reciprocates in the normal manner, trip pins 42 and 43 will engage and pivot arm member 61, correspondingly causing the axial displacement of spool 51 and the alternative supply of fluid under pressure to opposite sides of the piston head portion in chamber 28 to extend and retract the piston in the conventional manner.

Generally, filter 16 operates in a manner whereby fluid under line pressure is supplied to valve 20, valve 20 operates to direct such line pressure to opposite sides of piston head portion 40 to reciprocate piston 18, fluid expelled from chamber 28 flows through valve 20 to fluid line section 12a from which a portion thereof is drawn into guide member 19, fluid drawn into guide member 19 is forced passed check valve 38, through filter medium 33 and chamber 31 and into branch line 32, and the reciprocal action of rod 41 causes trip pins 42 and 43 to pivot arm member 61 which correspondingly functions to reciprocate spool 51 of the valve. Typically, line pressure will be 60 psi, the diameter of piston head portion 40 will be 3" and the diameter of rod portion 41 will be in the order of 0.25" so that the effect of the greater cross sectional area of the piston head portion relative to the cross sectional area of the piston rod portion will be to increase the pressure of the fluid drawn into guide member 19, passing through filter medium 33 and discharged into branch line 32. Such flow of oil through filter medium 33 finer than the filter medium of primary filter 15 and at a pressure higher than the pressure applied to the primary filter, results in the flow of a cleaner oil back to the engine.

Figure 4:
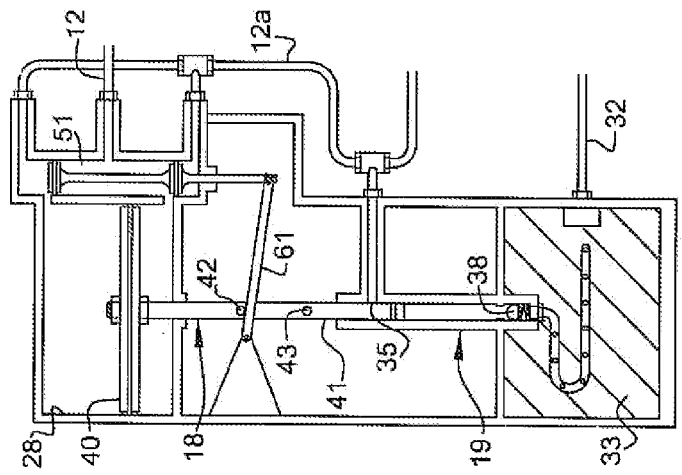
FIG. 4 is a view similar to the views shown in FIGS. 2 and 3, illustrating the piston in its fully extended position.
Figure 3:
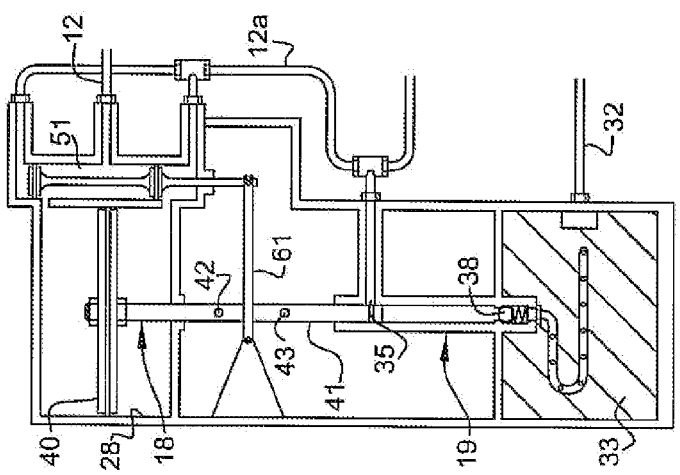
FIG. 3 is a view similar to the view shown in FIG. 2 illustrating the piston in an intermediate position.
Figure 2:
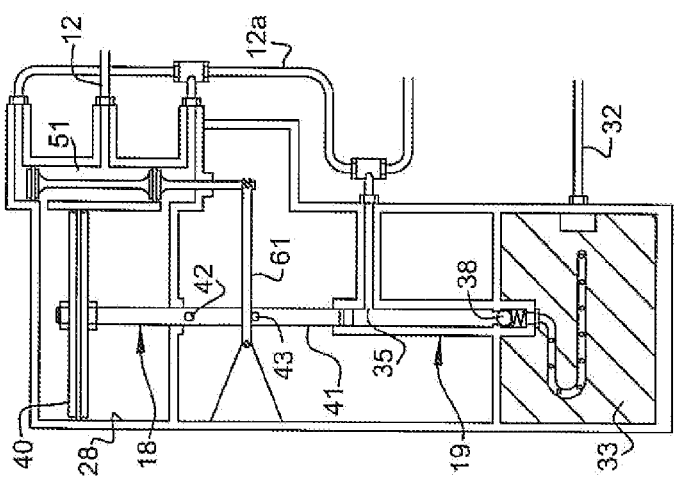
FIG. 2 is a vertical cross-sectional view of the secondary filter shown in FIG. 1 illustrating the piston thereof in its fully retracted position.

Referring to FIGS. 2 through 4, there is illustrated sequential positions of the various components of the secondary filter in drawing a portion of the fluid from the fluid line, increasing the pressure of such portion as it is forced through a filter medium and then returned to the fluid line. With the piston in a fully retracted position and the spool in a position as shown in FIG. 2, fluid drawn through fluid line 12 will be caused to flow to the head side of piston 18 in chamber 28 to cause the piston to extend, fluid on the rod side of piston 18 in chamber 28 to flow into line section 12a and fluid from line 12a to be drawn into the chamber of guide member 19. As the piston continues to extend, the lower end of rod portion 41 will close port 35 isolating the drawn portion of fluid from line section 12a and pressurizing such drawn portion as it is forced through guide member 19, passed check valve 38 and through filter medium 33 and discharged into branch line 32. As the piston continues to extend, trip pin 43 will engage arm member 61 to pivot the arm member and correspondingly axially displace spool 51 as shown in FIG. 4. Upon such displacement of spool 51, fluid under line pressure will be admitted to the rod side of the piston in chamber 28 causing the piston to retract and fluid in the piston head side of chamber 28 to be discharged into fluid line section 12a until the piston is displaced to the fully retracted position as shown in FIG. 2. With line pressure continuing to be supplied to valve 20 as the piston displaces to the fully retracted position, trip pin 43 will engage arm member 61 to displace spool 51 to the position as shown in FIG. 2 to begin another cycle of the displacement of the piston between its fully retracted and extended positions to correspondingly draw another portion of fluid from fluid line section 12a, compress it and thus cause it to flow through filter medium 33. Repeated passing of portions of fluid through filter medium 33 results in the withdrawal, filtering and return of portions of the fluid in the system having a smaller amount of contaminants and thus contributing to an increased cleaning of the fluid in the system.

The components of secondary filter 16 are sized, configured and positioned so that the effect of such filter is to draw portions of fluid from the fluid line of the system, compressing such portions as a result of the application of line pressure to a piston providing different cross sectional areas acting on such portion and passing such compressed portion of fluid through a fine filter medium to enhance the removal of contaminants from such portion which is returned to the fluid line. Although a specific embodiment of the proposed secondary filter has been illustrated and described, it is to be understood that other structures may be used which function medium than any medium provided in a primary filter and returning such filtered portion to the fluid line of a system.

The type of secondary filter as described further may be modified by providing a bypass for valve 20 with a pressure release valve in such bypass, and providing a replaceable cartridge containing filter medium 33. Alternate means further may be employed or displacing the spool of the valve as the piston displaces for directing fluid under pressure to opposite sides of the piston head. Such means may be mechanical, hydraulic or pneumatic.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. A filter connectable to a fluff pine under pressure, comprising:

means defining a first chamber having a cylindrical wall and a pair of axially spaced ports;

means defining a second chamber having a cylindrical wall disposed axially relative to said first chamber and a radially disposed inlet communicable with said fluid line and an axially spaced outlet port;

means defining a third chamber having an inlet port communicating with the outlet port of said second chamber, an outlet port communicable with said fluid line and a filter medium disposed therein between said inlet and outlet ports thereof, a piston having a head portion disposed in said first chamber, cooperating with said first mentioned means to provide a first variable chamber communicating with one of said ports of said first mentioned chamber and a second variable chamber communicating with the other of said ports of said first mentioned means, and a rod portion received in said second chamber, provided with a length sufficient to unobstruct said inlet port of said second chamber when said piston is in a retracted position, allowing fluid from said fluid line to flow into said second chamber, and to obstruct said inlet port of said second chamber when said piston is in an extended position;

a valve having an inlet port communicable with said fluid line and a pair of outlet ports, operative to alternatively intercommunicate said inlet port thereof with one of said ports of said variable chambers and the other of said ports of said variable chambers with said outlet port thereof, and said inlet port thereof with the other of said ports of said variable chambers and the one of said ports of said variable chambers with said outlet thereof, to reciprocate said piston; and means responsive to the reciprocation of said piston for effecting the operation of said valve to alternatively intercommunicate said fluid line with one of said variable chambers, whereby upon reciprocation of said piston, fluid will be drawn from said fluid line into said second chamber and expelled from said second chamber and through said third chamber to be filtered.

2. A filter according to claim 1 wherein the diameter of said piston head portion is greater than the diameter of said piston rod portion.

3. A filter according to claim 2 wherein the ratio of the diameter of the piston head portion to the diameter of the rod portion is not less than 12:1.

4. A filter according to claim 1 wherein said filter medium comprises a fabric material.

5. A filter according to claim 4 wherein said fabric material is highly compacted in said third chamber.

6. A filter according to claim 1 including a check valve disposed between said second and third chambers.

7. A filter according to claim 1 including a conduit disposed in said filter medium having an inlet communicating with the outlet port of said second chamber, and a plurality of outlet ports spaced along the length thereof.

8. A filter according to claim 1 wherein the outlet ports of said valve communicate with the inlet port of said second chamber.

9. A filter according to claim 8 wherein said outlet ports of said valve further communicate with said fluid line.

10. A filter according to claim 1 wherein said fluid line has a pressure of 60 psi.

11. A filter according to claim 1 wherein said valve comprises a spool valve.

12. A filter according to claim 11 wherein said spool valve is reciprocative along the axis thereof.

13. A filter according to claim 12 wherein the axes of said piston and spool valves are substantially parallel.

14. A filter according to claim 11 wherein said means for effecting the reciprocation of said valve comprises an arm member pivotally connected to a housing supporting said piston and said valve, and operatively connected to said valve, and a pair of spaced trips disposed on said piston rod portion, on opposite sides of and engageable with said arm member, whereby upon reciprocation of said piston said trips will engage and pivot said arm member to corresponding cause, the connection of said arm member to said spool valve to translate the pivotal movement of said arm member to reciprocal movement of said spool member.

15. A filter according to claim 14 wherein the connection of said arm member to said spool valve includes an elongated opening along the length of said arm member and a pin disposed on said spool valve and received in and slideable along said elongated opening.

16. A filter according to claim 15 wherein the spool of said valve includes an axially extending portion and said pin is disposed on said extended portion.

17. A filter according to claim 14 wherein said reciprocating piston, reciprocating spool valve, arm member and inlet port of said second chamber are configured, sized and interrelated to cause fluid drawn from said fluid line to be pumped through said second and third chambers at a pressure in excess of the pressure of said fluid line.

18. An oil lubricating system for an engine, comprising: an oil sump provided on said engine;

a fluid line for conveying oil from said sump to portions of said engine to be lubricated;

an oil pump provided in said fluid line for circulating oil from said sump through said fluid line a primary oil filter provided in said fluid line between said oil pump and said engine portion to be lubricated; and a secondary oil filter provided in said fluid line disposed between said primary filter and said sump, comprising:

means defining a first chamber having a cylindrical wall and a pair of axially spaced ports;

means defining a second chamber having a cylindrical wall disposed axially relative to said first chamber, a radially disposed inlet communicating with said fluid line between said primary filter and said engine portion, and an axially spaced outlet port;

means defining a third chamber having an inlet port communicating with the outlet port of said second chamber, an outlet port communicating with said fluid line between said primary filter and said engine portions, and a filter medium disposed therein between said inlet and outlet ports thereof;

a piston having a head portion disposed in said first chamber, cooperating with said first mentioned means to provide a first variable chamber communicating with one of said ports of said first mentioned chamber and a second variable chamber communicating with the other of said ports of said first mentioned means, and a rod portion received in said second chamber, provided with a length sufficient to unobstruct said inlet port of said second chamber when said piston is in a retracted position, allowing fluid from said fluid line to flow into said second chamber, and to obstruct said inlet port of said second chamber when said piston is in an extended position;

a valve having an inlet port communicating with said fluid line between said coarse filter and said engine portions, and a pair of outlet ports, operative to alternatively intercommunicate said inlet port thereof with one of said ports of said variable chambers and the other of said ports of said variable chambers with said outlet port thereof, and said inlet port thereof with the other of said ports of said variable chambers and the one of said ports of said variable chambers with said outlet thereof, to reciprocate said piston; and means responsive to the reciprocation of said piston for effecting the operation of said valve to alternatively intercommunicate said fluid line with one of said variable chambers, whereby upon reciprocation of said piston, fluid will be drawn from said fluid line into said second chamber and expelled from said second chamber and through said third chamber to be filtered.

19. A system according to claim 18 wherein the diameter of said piston head portion of said secondary filter is greater than the diameter of said piston rod portion thereof.

20. A filter according to claim 19 wherein the ratio of the diameter of the piston head portion to the diameter of the piston rod portion is not less than 12:1.

21. A system according to claim 18 including a check valve disposed between said second and third chambers.

22. A system according to claim 18 wherein the outlet ports of said valve communicate with said fluid line between said primary filter and said engine portion.

23. A system according to claim 18 wherein said fluid line has a pressure of 60 psi.

24. A system according to claim 18 wherein said valve comprises a spool valve.

* * * * *

UNITED STATES PATENT AND TRADEMARK OFFICE
CERTIFICATE OF CORRECTION

| | |
|---|---|
| PATENT NO. | : 7,632,398 B2 |
| APPLICATION NO. | : 12/042509 |
| DATED | : December 15, 2009 |
| INVENTOR(S) | : Cummings |

Page 1 of 1

It is certified that error appears in the above-identified patent and that said Letters Patent is hereby corrected as shown below:

Col 5, line 4 "fluff pine" should be changed to --fluid line--

Signed and Sealed this

Twenty-ninth Day of June, 2010

David J. Kappos
*Director of the United States Patent and Trademark Office*